INVENTORS
KENNETH R. BULLOCK
HARRY M. TOMLINSON

BY J. F. Voek

THEIR AGENT

United States Patent Office 3,459,877
Patented Aug. 5, 1969

3,459,877
ELECTRIC CABLE
Kenneth R. Bullock and Harry M. Tomlinson, Sycamore, Ill., assignors to Anaconda Wire and Cable Company, a corporation of Delaware
Filed Jan. 18, 1965, Ser. No. 426,140
Int. Cl. H01b 7/18, 11/06
U.S. Cl. 174—107          6 Claims Our invention relates to multiconductor electric cables and particularly to such cables having metal shielding surrounded by a protective jacket.

In the manufacture of telephone cables it has long been known to strand a plurality of insulated electrical conductors, usually twisted into pairs, into a cable core and to extrude a lead sheath over this core. More recently it has been found more economical to substitute a metal shield and extruded plastic jacket for the lead sheath. Such a cable construction, employing an aluminum shield is widely used and known as "Alpeth" cable, and similar constructions with copper shields are also well known. One of the developments that made possible the substitution of Alpeth for lead sheath was the substitution of moisture-proof plastic insulation for the hygroscopic paper insulation that was commonly used for lead-sheathed telephone cables.

However, the high-electrical-conductivity metals, aluminum and copper are so much more rigid than lead, even when fully annealed, that they are used in much thinner sections. For example, whereas the walls of lead-sheathed cables are frequently a tenth of an inch (0.1) thick and more and very seldom less than 0.06 inch thick, the thickness of Alpeth shields is usually only 0.006 or 0.008 inch and never more than 0.015 inch. Small diameter cables, by which we refer to cables of the order of ⅜ inch or ½ inch diameter under the shield, have been widely used with straight-walled shields and are considered to be satisfactory. But large diameter cables, by which we refer to cables of the order of ¾ inch and larger under the shield, have the defect that the shield buckles and crimps when the cable is flexed or bent, as it is required to be, for shipping on cable reels. This defect has been overcome to the extent that the cable can be bent around cable drums having diameters 20 or 30 times the cable diameter, by corrugating the shield circumferentially, and corrugated shields are generally employed for Alpeth type cables with cores exceeding 0.69 inch and universally employed in cables with cores in the order of ¾ inch or more.

Corrugation of the cable shield has certain disadvantages, however. For one thing, the need to form corrugations complicates the sheathing equipment and makes it more expensive and more difficult to maintain in trouble-free operation. Also, the corrugations take up radial space and make the cable larger. Furthermore, the corrugations make it harder to achieve a good tight seam where the strip of shielding overlaps. Obviously, also, more metal is required in a corrugated shield and the electrical resistance is greater. Another disadvantage of corrugated shields is that the corrugations show through the jacket and make it difficult to produce a smooth-surfaced, easy cleaning cable without an excessive expenditure of jacket material.

We have discovered that large shielded cables can be made that are quite capable of bending around a small diameter without buckling if the shield is firmly bonded to the inside surface of the cable jacket. In fact, and surprisingly, the cables of our invention with uncorrugated shields are even better in bending performance than the equivalent conventional cables with corrugated shields.

We have invented a large-diameter, straight-surfaced communication cable comprising a core, substantially circular in section, that comprises a plurality of insulated conductors. The core has a diameter of at least ¾ of an inch and there is a metallic shield preferably of aluminum or copper surrounding the core. The shield is formed from unsupported metal strip no greater than 0.015 inch (15 mils) in gage. It is preferably applied straight-away with edges parallel to the axis of the cable and with the edges overlapped to provide a double thickness of shield metal at the seam extending lengthwise of the cable. It is an essential feature of our cable that the shield is straight surfaced and free from corrugations.

An adhesive coating, preferably an extruded coating of ethyleneacrylic acid copolymer, hereinafter to be described, is bonded to the outer surface of the strip and the coating seals together the double thickness of the shield where it is overlapped. Our cable is covered with a tubular protective jacket, at least 0.03 inch thick, such as an extruded jacket of polyethylene, and this jacket is bonded to the shield by means of the adhesive coating thereon. The resulting cable can consistently be bent around a diameter as small as six times its own diameter without cracking the shield.

A more thorough understanding of our invention may be gained from a consideration of the appended drawing. In the drawing.

Figure 1:
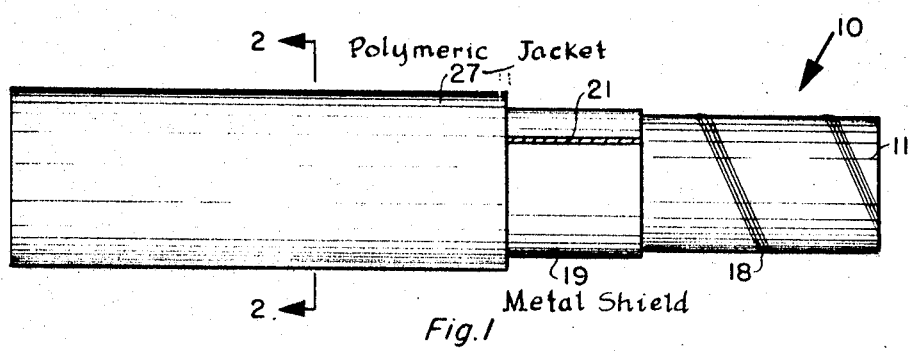
FIGURE 1 shows a side view, with the layers cut back, of a cable of our invention.
Figure 2:
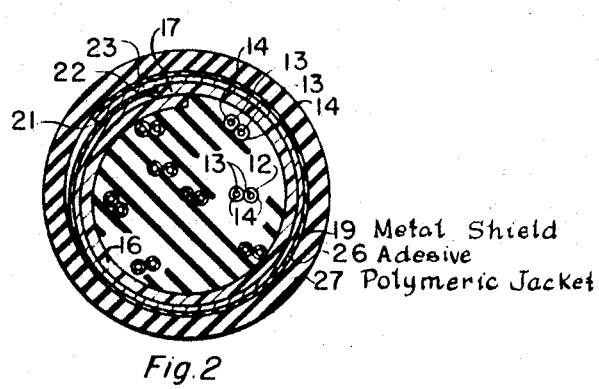
FIGURE 2 shows an enlarged section through the cable of FIGURE 1.

Referring to FIGURES 1 and 2 a cable, indicated generally by the numeral 10 has a core 11, which is at least ¾ inch in diameter, but our invention may, of course, be used for substantially larger cores, such as cores 3 inches in diameter and even larger. This core is comprised of a plurality of paired conductors 12, each of said conductors having a central wire 13 and surrounding wall of solid polyethylene insulation 14, and a core wrapping 16 of rubber tape reinforced with polyethylene terephthalate film. The core wrapping is not a novel feature of our invention and it is understood that other known types of core wrappings may also be used. Although it is customary to pair the conductors of telephone cables it will be understood that our invention will also be useful for cables, such as control cables where single, unpaired, conductors comprise the core 11, or the conductors may be quadded or made up of different combinations of singles, pairs, and quads; and may also contain coaxial cables within the core without exceeding the scope of our invention. The wrapping 16 has a slight overlap 17 and is firmly bound down by a helically applied binder thread 18 in a known manner. Although we have shown conductors insulated with polyethylene, it will be understood that other insulations such as expanded polyethylene and paper also fall within the scope of our invention.

Figure 3:
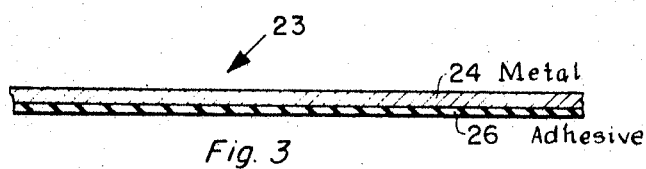
FIGURE 3 shows a section of a strip used to form the shield of our cable.

The core 11 does not constitute a novel feature of the cable of our invention and the elements so far described are not distinguished from the corresponding parts of the prior art cable. Over the core 11, however, we have wrapped a longitudinally applied aluminum shield 19. The shield 19 is applied by folding it over the core 11 with one straight edge 21 overlapping another straight edge 22, both edges being parallel to the axis of the cable. By this means there is formed a seam of double thickness extending straight-away along the cable. Such a seam, which forms the shield into a closed tube, has the advantage that the metal edge 21 of the shield is bonded on both surfaces and is thus doubly restrained from warping when the cable is flexed. Although we have shown a shield 19 of alumninum it is also useful to make the shield of copper, in which case a thinner gage strip may be employed. For example where the aluminum shield 19 is 0.008 inch thick we might substitute a copper shield only 0.005 inch thick, due to the greater conductivity of copper. The shield 19 is folded around the core 11 by guiding a strip 23 (FIGURE 3) together with the core 11 through appropriate folding dies in a known manner. The strip 23 which has an aluminum portion 24, for which other metals may be substituted within the scope of our invention, is coated with an adhesive layer 26. The aluminum thickness usually varies between 0.006 and 0.010 inch but is never greater than 0.015 inch. In determining the proper thickness, consideration must be taken of the conductivity required in view of the probability of lightning and the proximity of the installed cable to power lines, balanced against the cost and rigidity of heavier gages. The adhesive 26 must be a material that will form a strong, permanent bond to a jacket 27 which is extruded over the entire cable assembly and it must, of course, be able to retain its adhesive properties, both to the jacket and to the metal shield, after being subjected to the high extrusion temperatures. The jacket 27 is, preferably, polyethylene which is very difficult to bond. A polyethylene jacket may be extruded from any of a number of commercially available jacket stocks.

We prefer to use for our adhesive an extruded layer about one or two mils thick of an ethylene-acrylic acid copolymer which is a random copolymer having approximately 8 percent by weight of the arcrylic acid manufactured by copolymerizing ethylene and acrylic acid under high pressure. The preferred adhesive has a melt index of about 5, when measured by ASTM method D1238–62T using Condition E, i.e., 190° C. and 2160 grams load, and the expression "melt index" as used throughout this specification refers to the value determined by this method. The melt index, which measures a function of molecular weight and molecular weight distribution is generally used by persons skilled in polymer application arts for product specification and identification. A preferred adhesive resin suitable for coating metal strip used for the shield 19 of our cable, which is manufactured commercially, has the following properties:

| Test | ASTM method | Value |
|---|---|---|
| Melt index, gm./min. | D1238 | 5.0 |
| Density (23° C.) gm./ml. | D1505 | 0.934 |
| Tensile strength, p.s.i. | D412 | 3360 |
| Elongation, percent. | D412 | 600 |
| Low temperature brittleness, ° C. | D746 | <−76 |
| Stiffness, p.s.i.×10⁴. | D747 | 1.5 |
| Hardness, Shore C. | D676 | 85 |
| Dielectric strength, volts/mil. | D149 | 500 |
| Dissipation factor (55 MC). | D150 | 0.0017 |
| Dielectric constant (55 MC). | D150 | 2.41 |

The coating 26 is not tacky at room temperature which makes the strip 23 much easier to handle during manufacture than a tacky strip would be. The result is that bonding does not take place until the jacket 27 is extruded about the core 11 and the shield 19 is subjected to high temperature in the jacket extruder. At this time, not only does the extruded jacket stock bond firmly to the shield but the shield seam is itself sealed at the double layer 23.

The novel features of the cable of FIGURE 1 can best be understood by comparison with a prior art cable. In such a cable a corrugated shield with an overlapped seam is applied over the core. The corrugations have heretofore been found necessary to prevent cracking of the shield when the cable is wound onto a reel, but the depth of the corrugations requires a space; and when a corrugated jacket, which has the same thickness of metal as the jacket 27 of the cable of our invention, is employed, the overall size of the cable is much greater than our cable 10. A typical jacket thickness over a ¾ inch diameter core is 0.05 inch and at least 0.03 inch thickness is required to attain the maximum advantages of our invention. With a jacket of this thickness the prior art cable shows definite waviness, and regular depressions where the corrugations in the shield carry through the jacket.

To test the advantages of our invention of a large-diameter, straight-surfaced cable over the prior art corrugated cables, two cables were prepared as follows:

Cable 1.—(prior art)

| | |
|---|---|
| Core | 100 pairs AWG 19 polyethylene-insulated conductors. |
| Core diameter | 1.25 inch. |
| Shield | Corrugated aluminum. |
| Jacket | Polyethylene. |
| Diameter over jacket | 1.49 inch. |

Cable 2

| | |
|---|---|
| Core | 100 pairs AWG 19 polyethylene-insulated conductors. |
| Core diameter | 1.25 inch. |
| Shield | Straight-walled aluminum bonded to jacket. |
| Jacket | Polyethylene. |
| Diameter over jacket | 1.46 inch. |

Cables 1 and 2 were wound around mandrels six times the cable diameter and the shield of Cable 2 was found to be intact while the corrugated shield of Cable 1 was cracked.

Cables 1 and 2 were subjected to cold impact tests by holding them at −45° C. for 4 hours and then dropping weights upon section of cable laid horizontally, with the results shown in the table.

TABLE

| | Number of cracked jackets in 5 drops | |
|---|---|---|
| Ft. lbs. of impact | Cable 1 | Cable 2 |
| 4.5 | 3 | 0 |
| 6 | 4 | 0 |
| 9 | 4 | 0 |

Cables 1 and 2 were bent 180° around a mandrel 10 times the cable diameter. The cables were then straightened and bent again but in the reverse direction. The cables were then again straightened and bent in the original direction. The shield of Cable 1 was then found to have cracked while the shield of Cable 2 was intact.

The results of the above tests are entirely unexpected in that they show a straight-walled cable shield to outperform a corrugated cable shield in just the kind of tests which the cable shields had been corrugated originally to meet.

We claim:

1. A large-diameter, straightt-surfaced, communication cable comprising:
  (A) a core substantially circular in section,
    (a) said core comprising a plurality of insulated electrical conductors, and
    (b) said core having a diameter of at least 0.75 inch,
  (B) a metallic shield surrounding said core,
    (a) said shield being formed from unsupported metal strip no greater than 0.015 inch thick,
    (b) said shield having edges parallel to the axis of said cable,
    (c) said edges overlapping to provide a double thickness of said shield lengthwise of said cable, and
    (d) said shield being straight-surfaced and free from corrugations,
  (C) an adhesive coating bonded to the outer surface of said strip,
    (a) said coating sealing together said double thickness of said shield, and
  (D) a tubular protective jacket surrounding said shield,
    (a) said jacket being at least 0.03 inch in wall thickness, and
    (b) said jacket having substantially its entire inner surface bonded to said shield by means of said coating, (E) said cable being bendable around a mandrel 6 times its own diameter without cracking said shield.

2. The cable of claim 1 wherein said shield is aluminum.

3. The cable of claim 1 wherein said shield is copper.

4. A large-diameter, straight-surfaced, communication cable comprising:
- (A) a core substantially circular in section,
  - (a) said core comprising a plurality of insulated electrical conductors, and
  - (b) said core having a diameter of at least 0.75 inch,
- (B) a metallic shield surrounding said core,
  - (a) said shield being formed from unsupported metal strip no greater than 0.015 inch thick,
  - (b) said shield having edges parallel to the axis of said cable,
  - (c) said edges overlapping to provide a double thickness of said shield lengthwise of said cable, and
  - (d) said shield being straight-surfaced and free from corrugations,
- (C) a coating of ethylene-acrylic acid copolymer having a melt index of about 5 bonded to the outer surface of said strip,
  - (a) said coating sealing together said double thickness of said shield, and
- (D) a tubular polyethylene jacket surrounding said shield,
  - (a) said jacket being at least 0.03 inch in wall thickness, and
  - (b) said jacket having substantially its entire inner surface bonded to said shield by means of said coating,
- (E) said cable being bendable around a mandrel 6 times its own diameter without cracking said shield.

5. The cable of claim 4 wherein said shield is aluminum.

6. The cable of claim 4 wherein said shield is copper.

References Cited

UNITED STATES PATENTS

| 3,136,676 | 6/1964 | Fisch | 156—244 X |
| 3,233,036 | 2/1966 | Jachimowicz | 174—36 X |
| 3,244,799 | 4/1966 | Roberts | 174—107 |
| 3,309,455 | 3/1967 | Mildner | 174—107 X |

FOREIGN PATENTS

| 886,417 | 1/1962 | Great Britain. |
| 968,061 | 8/1964 | Great Britain. |
| 1,261,740 | 4/1961 | France. |

LEWIS H. MYERS, Primary Examiner

A. T. GRIMLEY, Assistant Examiner

U.S. Cl. X.R.

138—128; 156—54; 174—36, 110